United States Patent [19]

Reilly et al.

[11] 3,962,938

[45] June 15, 1976

[54] METHOD AND APPARATUS IMPROVEMENTS FOR TRIMMING PLASTIC ARTICLES

[75] Inventors: Joseph R. Reilly, Naugatuck; Lars G. Schon, Bloomfield, both of Conn.

[73] Assignee: Monsanto Company, St. Louis, Mo.

[22] Filed: May 23, 1975

[21] Appl. No.: 580,538

Related U.S. Application Data

[62] Division of Ser. No. 472,638, May 23, 1974.

[52] U.S. Cl. .................................... 82/47; 82/52; 82/101
[51] Int. Cl.² .................... B23B 1/00; B23B 5/14
[58] Field of Search .................... 82/47, 46, 52, 101

[56] References Cited
UNITED STATES PATENTS

| | | | |
|---|---|---|---|
| 3,406,598 | 10/1968 | Doucet | 82/101 X |
| 3,429,211 | 2/1969 | Pelot | 82/46 |
| 3,653,285 | 4/1972 | Yoshikawa et al. | 82/101 |
| 3,675,521 | 7/1972 | Ziegler | 82/101 |
| 3,886,824 | 6/1975 | Michel et al. | 82/47 |

*Primary Examiner*—Leonidas Vlachos
*Attorney, Agent, or Firm*—Michael J. Murphy

[57] ABSTRACT

In trimming moils from plastic articles with a blade interposed in a path along which the articles are moving while engaged with fixed and moving guides, the improvement downstream of the blade is provided of a rotatably driven moil discharge wheel and an opposite cooperating anvil forming a moil discharge path between them. The process improvements involve engaging the moil after cutting by the blade with the surfaces of the wheel and anvil and conveying the engaged moil along a path away from that taken during cutting by means of the revolving wheel.

3 Claims, 4 Drawing Figures

METHOD AND APPARATUS IMPROVEMENTS FOR TRIMMING PLASTIC ARTICLES

This is a division of copending application Ser. No. 472,638, filed May 23, 1974.

CROSS REFERENCES TO RELATED APPLICATIONS

U.S. Ser. No. 336,023, filed Feb. 26, 1973, now U.S. Pat. No. 3,873,660.

U.S. Ser. No. 467,378, filed May 6, 1974.

BACKGROUND OF THE INVENTION

This invention relates to deflashing plastic articles and more particularly to trimming moils from the necks of plastic articles with a blade as they sequentially move along a path of travel.

As disclosed in U.S. Pat. Nos. 3,406,598; 3,429,211 and 3,675,521, moils constituting unwanted plastic integrally formed with an article during molding may be removed therefrom in a downstream station by progressively cutting through the plastic as the article is advanced across a blade while engaged between fixed and moving guide members. After such trimming, the articles are usually forwarded to one or more downstream stations where other secondary operations are performed such as quality testing, labeling, decorating, bulk packaging etc.

In systems for continuously manufacturing finished articles employing the aforesaid approach to deflashing, it may occur that downstream equipment at times cannot accommodate the articles issuing from the trimming station, e.g. because of a malfunction of such equipment. Thus, with no place to put oncoming articles, it may be necessary to shut down upstream equipment until the malfunction is corrected, and this reduces the overall efficiency of the manufacturing line even though the upstream equipment is not otherwise associated with the malfunction.

In addition, blockage of the trimming system can occur requiring costly downtime for cleanout. For example, the particular part of the article supported between the guide means, such as the neck finish, may have been under-blown in the molding station so that adequate driving force to move it across the trimming blade cannot be developed by the movable guide, and the article therefore hangs up part way across the knife. Or the blade could be sufficiently dull after substantial use such that it will no longer fully penetrate the plastic and a partially trimmed article under such conditions could again hang up part way along the trimming path. In the past such jamming in the trimming station has been alleviated by manually physically prying jammed articles out from between the closely spaced components of the apparatus and this can cause costly damage to the slicing blade.

SUMMARY OF THE INVENTION

Now, however, improvments have been developed which overcome the aforementioned prior art difficulties encountered in trimming flash from molded plastic articles.

Accordingly, it is a principal object of this invention to provide improvements in trimming apparatus of the type employing a blade for sectioning articles as they are advanced along a cutting path between opposing guide members.

An additional object is to provide improvements in apparatus of the aforementioned general type which alleviate the effect of upstream or downstream conditions on such apparatus.

A further object is to provide method and apparatus improvements in trimming systems of the aforementioned type for orderly accommodating articles continuously entering such system in a continuous manufacturing line even though downstream equipment may be temporarily shut down.

A specific object of this invention is to provide improvements in apparatus of the aforementioned general type which facilitate handling severed or partially severed moils.

Other objects of this invention will in part be obvious and will in part appear hereinafter when considered with respect to the detailed description and accompanying drawings.

These and other objects are accomplished in apparatus for trimming moils from plastic articles as they move along a cutting path which includes knife means to accomplish such trimming, and guide means for engaging and transporting each article along such path while in cutting engagement with the knife means by providing the improvement which comprises moil discharge means downstream of the knife means comprising a rotatably driven moil discharge wheel and an anvil opposite such wheel forming a discharge path with such wheel curving away from the cutting path.

From a process standpoint, there is provided in the process of removing a moil from the neck of a plastic article which comprises cutting through the moil while the article and moil are vertically positioned and rolling forwardly about a longitudinal axis, the improvement which comprises engaging the moil after cutting with the surfaces of a revolving discharge wheel and a supporting anvil and conveying the engaged moil along a path away from that taken during the forward rolling movement by means of the revolving wheel.

DETAILED DESCRIPTION OF THE DRAWINGS

In describing the invention reference will be made to the accompanying drawings wherein.

DETAILED DESCRIPTION OF ILLUSTRATED EMBODIMENTS

Figure 1:
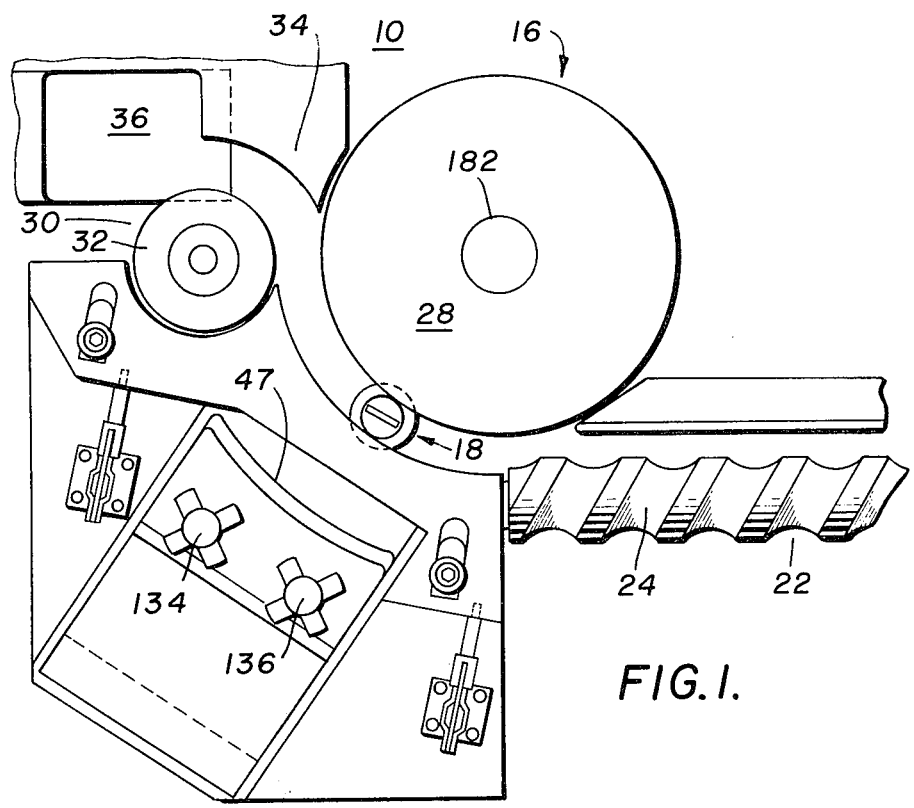
FIG. 1 is a plan view of apparatus embodying the present invention in the direction 1—1 of FIG. 3 showing the knife assembly in retracted position.
Figure 2:
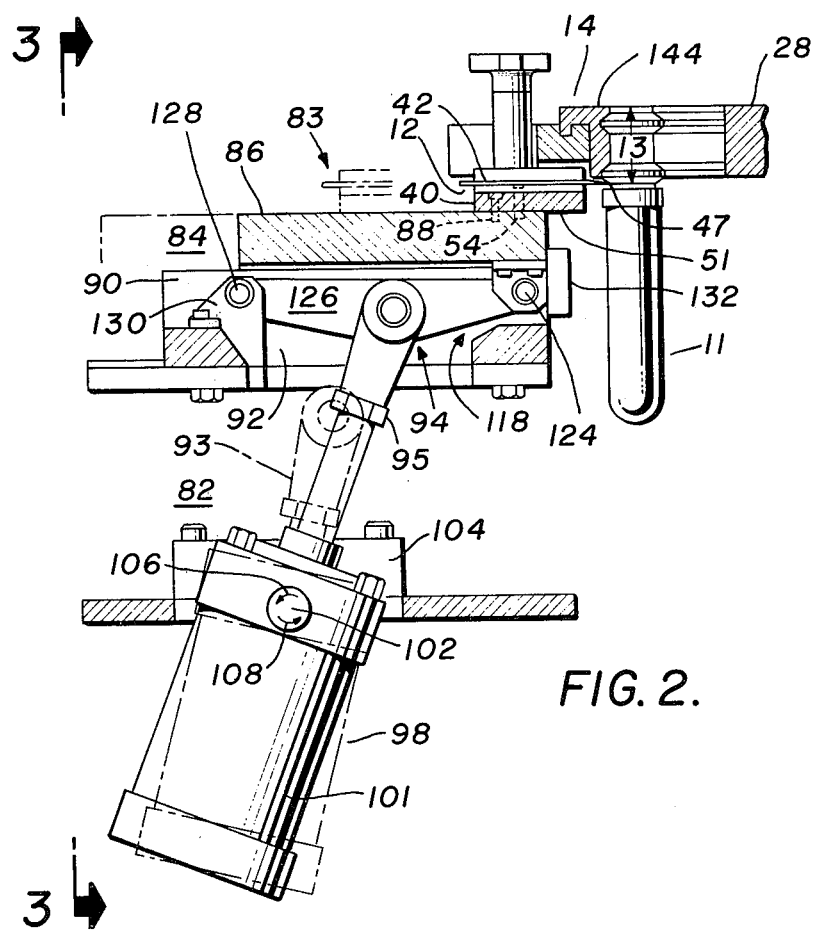
FIG. 2 is a sectional view along 2—2 of FIG. 3 showing the knife assembly in its forward operative position.
Figure 3:
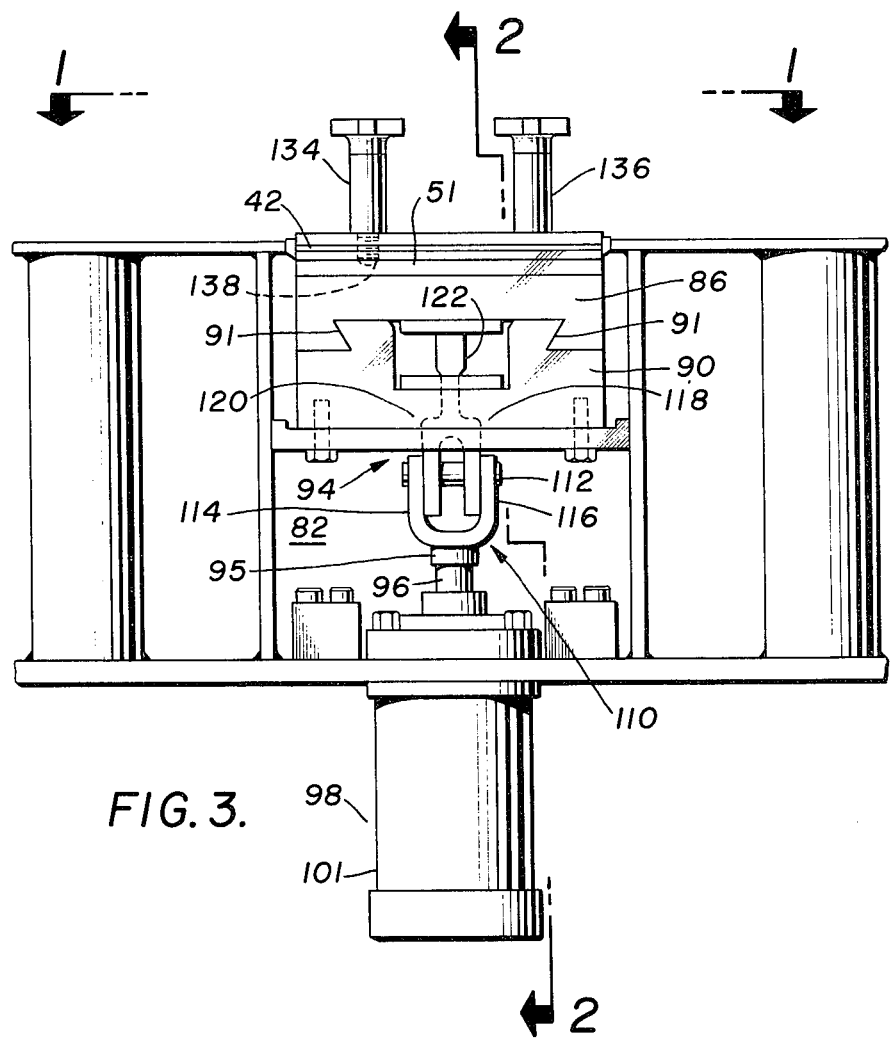
FIG. 3 is an elevational view along 3—3 of FIG. 2.

Referring now to the drawings, there is shown in FIGS. 1–3, apparatus generally indicated as 10 for trimming moils from plastic articles 11. Apparatus 10 is equipped according to the present invention with a retractable knife assembly and includes knife means 12 (FIG. 2), fixed or stationary guide means 14 (FIG. 2) located, in the illustrated embodiment, above knife means 12, and movable guide means 16 opposite fixed guide means 14 which includes rotatably mounted wheel 28. Means 14 and 16 extend along either side of path 18 and function to engage each article 11 between them, for example in the moil area 13 (FIG. 2) thereof, so as to transport them along path 18 while in cutting engagement with knife means 12. Alternatively, knife means 12 could be arranged on the side of path 18 on which movable guide means 16 is located. Though means 14 and 16 are arcuate in lengthwise contour so that path 18 is curved, they could as well be straight so as to form a linear cutting path. Means 22 feed articles to be trimmed to knife means 12 in the deflashing station, and in the illustrated embodiment (FIG. 1) comprises screw conveyor 24 and adjacent, opposite, support bar 26 which sequentially advance articles 11 between them and deposit them at the inlet to path 18 for rolling engagement, as illustrated in FIG. 2, with wheel 28 of the movable guide means.

Means 30 downstream of knife means 12 direct severed moils and untrimmed articles exiting path 18 toward a recovery system, and comprises rotatably mounted moil discharge drive wheel 32 and opposite moil discharge anvil 34 forming between them a curved path discharging into chute 36 which feeds such a recovery system, not shown.

Referring now to FIGS. 2 and 3, means 82 are provided for reciprocating knife means 12 with respect to stationary guide means 14 to selectively move blade 42 thereof into and out of operative cutting position in path 18, such positions being shown in full lines in FIG. 2 and in phantom lines at 83 therein. Means 82 comprises slide assembly 84 which includes elongated slide member 86 extending laterally back from blade 42 and path 18, carrying knife means 12 secured on its forward end. Bolts 88 fasten spacer plate 51 to member 86, plate 51 in turn carrying knife means 12 via pins 54 seated in holes in lower mounting plate 40. Stationary block 90 (FIG. 3) supports member 86 for sliding movement along mating angled faces 91. Block 90 is centrally cut away at 92 (FIG. 2) to accommodate link assembly 94 connecting slide member 86 with an end portion of piston rod 96 of fluid motor means 98. The latter includes a fluid motor comprising housing 101 pivotally mounted at 102 to mounting plate 104 for oscillation in the direction of arrows 106, 108 beneath slide member 86. Though it may be manually actuated, the fluid motor is preferably operated via an automated position-controlling instrument circuit comprising a conventional electrically actuated solenoid valve mounted for operation in a pressurized air line operatively associated with a piston portion (not shown) within housing 101. Link assembly 94 includes a toggle mechanism comprising clevis 110 secured via extension 95 to the end of piston rod portion 96 having fixed cross pin 112 spanning branches 114, 116 of a Y-shaped portion thereof. Slide toggle link 118 has forked portion 120 movably pivoted on cross pin 112 and another portion at its opposite end 122 pivotally secured at 124 to slide member 86. Stationary toggle link 126 is pivotally mounted at 128 to stationary support 130 and movably pivoted at its other end to cross pin 112 intermediate the fingers of forked portion 120. Stop plate 132 in front of slide toggle link 118 is secured to a suitable structural support member, not shown, and positively delimits forward movement of slide member 86 such that the position of edge 47 of blade 42 in path 18 is accurately established by the abutment of member 86 with stop plate 132 and is not subject to any variability due to wear of the moving parts of toggle mechanism 94. As mentioned, projecting means comprising dowel pins 54 associated either with slide member 86 or spacer plate 51 are seated in alignment holes in the lower mounting plate of knife means 12. Any suitable means such as a pair of hand wheels 134, 136 tapped on their forward ends at 138 (FIG. 3) for threaded engagement in tapped sockets in slide member 86 through similar sockets in mounting plates 38, 40 may be used to releasably secure knife means 12 to the forward end of slide member 86 or to spacer plate 51 which in turn is secured to member 86.

Figure 4:
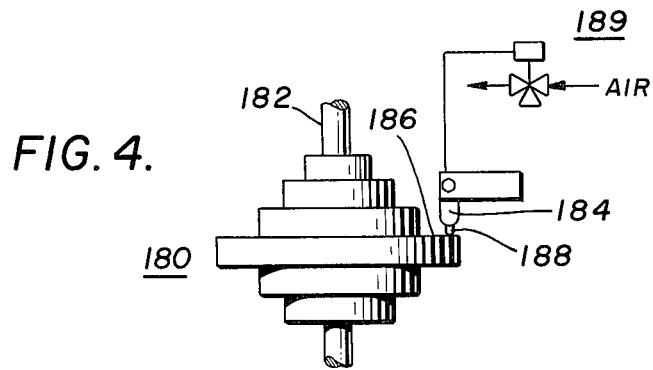
FIG. 4 is a schematic view of components for automating portions of the system of FIG. 1.

FIG. 4 illustrates a typical, commercially available torque limiting device 180 on shaft 182 which supports wheel 28 of movable guide means 16 (FIG. 1). As long as rotary contact of surface 186 of device 180 against tip 188 of switch 184 is maintained, i.e. the torque on shaft 182 is less than the setting on device 180, power from a suitable source, not shown, will continue to be transmitted through device 180 and wheel 28 will continue to rotate. When such rotary movement ceases because the torque on shaft 182 is excessive due, for example, from a dull edge 47 on blade 42, an underblown moil section 13 etc., switch 184 electrically activates solenoid valve 189 in the air line supplying fluid motor housing 101 in a conventional manner, thereby automatically shifting knife means 12 to the inoperative position shown at 93 in FIG. 2, out of cutting path 18. Suitable alarm means can be conventionally provided to alert an operator as to when this occurs. When the cause of generating excessive torque on shaft 182 has been eliminated, knife means 12 can be shifted forwardly into operative position via a conventional manually operated electrical switch, not shown, in order to allow trimming to commence again.

In overall operation, as plastic articles 11 sequentially proceed through path 18 in frictional rolling engagement with the periphery of wheel 28 and the opposing surface of anvil portion 144, sharp edge 47 of blade 42 penetrates through the plastic in the joint between moil 13 and the rest of the article. After moils 13 (FIG. 2) have been severed from articles 11, each one in the illustrated embodiment is engaged between wheel 32 and moil discharge anvil 34 and conveyed away from the deflashing station to chute 36 feeding a recovery station. When it is desired to continue to operate the system upstream of the deflashing station, but for some reason equipment downstream of the trimming station for further processing articles 11 after trimming is shut down, knife means 12 is caused, either manually or automatically via an override switch if necessary, to be retracted away from path 18 such that edge 47 does not project therein, while independently operable anvil portion 144 is left in place in operative position with respect to wheel 28, thereby permitting untrimmed preforms exiting path 18 to be fed to chute 36 via engagement of the still-attached moils 13 with moil discharge wheel 32 and anvil 34.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. In apparatus for trimming moils from plastic articles as they move along a cutting path which includes knife means to accomplish said trimming, guide means for engaging and transporting each article along said path while in cutting engagement with the knife means, the improvement which comprises:

moil discharge means downstream of the knife means comprising:
  i. a rotatably driven moil discharge wheel; and
  ii. an anvil opposite said wheel forming a discharge path with said wheel curving away from said cutting path.

2. In the process of removing a moil from the neck of a plastic article which comprises cutting through the moil while the article and moil are vertically positioned and rolling forwardly about a longitudinal axis, the improvement which comprises:

A. engaging said moil after said cutting with the surfaces of a revolving discharge wheel and a supporting anvil; and B. conveying said engaged moil along a path away from that taken during said forward rolling movement by means of said revolving wheel.

3. The process of claim 2 wherein the moil and the rest of the article are at least partially attached to each other during said engagement.

* * * * *